United States Patent [19]
Johnson

[11] Patent Number: 5,203,651
[45] Date of Patent: Apr. 20, 1993

[54] TAPPING ATTACHMENTS

[75] Inventor: Allan S. Johnson, Newport Beach, Calif.

[73] Assignee: Tapmatic Corporation, Irvine, Calif.

[21] Appl. No.: 715,343

[22] Filed: Jun. 14, 1991

Related U.S. Application Data

[63] Continuation-in-part of Ser. No. 330,752, Mar. 30, 1989, abandoned.

[51] Int. Cl.$^5$ .............................................. B23G 3/00
[52] U.S. Cl. ........................................ 408/59; 192/51;
    192/108; 408/56; 408/134; 408/139; 470/181;
    470/198
[58] Field of Search ...................... 409/135, 136, 231;
    408/134, 56, 57, 59, 139, 141, 142; 10/89 F, 129
    R, 136 R, 136 TS, 141 H; 192/21, 51, 46, 108;
    470/181, 182, 198

[56] References Cited

U.S. PATENT DOCUMENTS

| | | | |
|---|---|---|---|
| 1,381,197 | 6/1921 | John | 408/56 |
| 4,277,209 | 7/1981 | Benjamin et al. | 10/89 F |
| 4,396,317 | 8/1983 | Staron et al. | 408/59 |
| 4,740,116 | 4/1988 | Wellach | 10/89 F |
| 4,812,089 | 3/1989 | Petrie | 408/139 |

*Primary Examiner*—Daniel W. Howell
*Attorney, Agent, or Firm*—Joseph R. Evanns

[57] ABSTRACT

A tapping attachment for driving a tapping spindle constructed to be adapted for both direct drive and reverse drive of the spindle. The drive of the spindle is by way of a resiliently mounted dog ring having rigid radially extending drive dogs, extending radially outwardly and inwardly from a drive ring. The driving dogs are rigid, having slanting sides to accommodate clutching engagement and disengagement. Clutching engagement and disengagement occur as a result of relative axial movement as between the attachment and the drive spindle. The drive spindle has a central bore in which is provided an insert member having an axial bore which is connected to a flexible tube within the bore of the spindle, which accommodates relative axial movement, the flexible tube communicating with a similar bore in a tap itself. These bores provide a channel for continuously supplying coolant to the machine and to the spindle itself. In high pressure coolant applications the invention provides a rigid conduit tube together with back pressure relief arrangements.

14 Claims, 6 Drawing Sheets

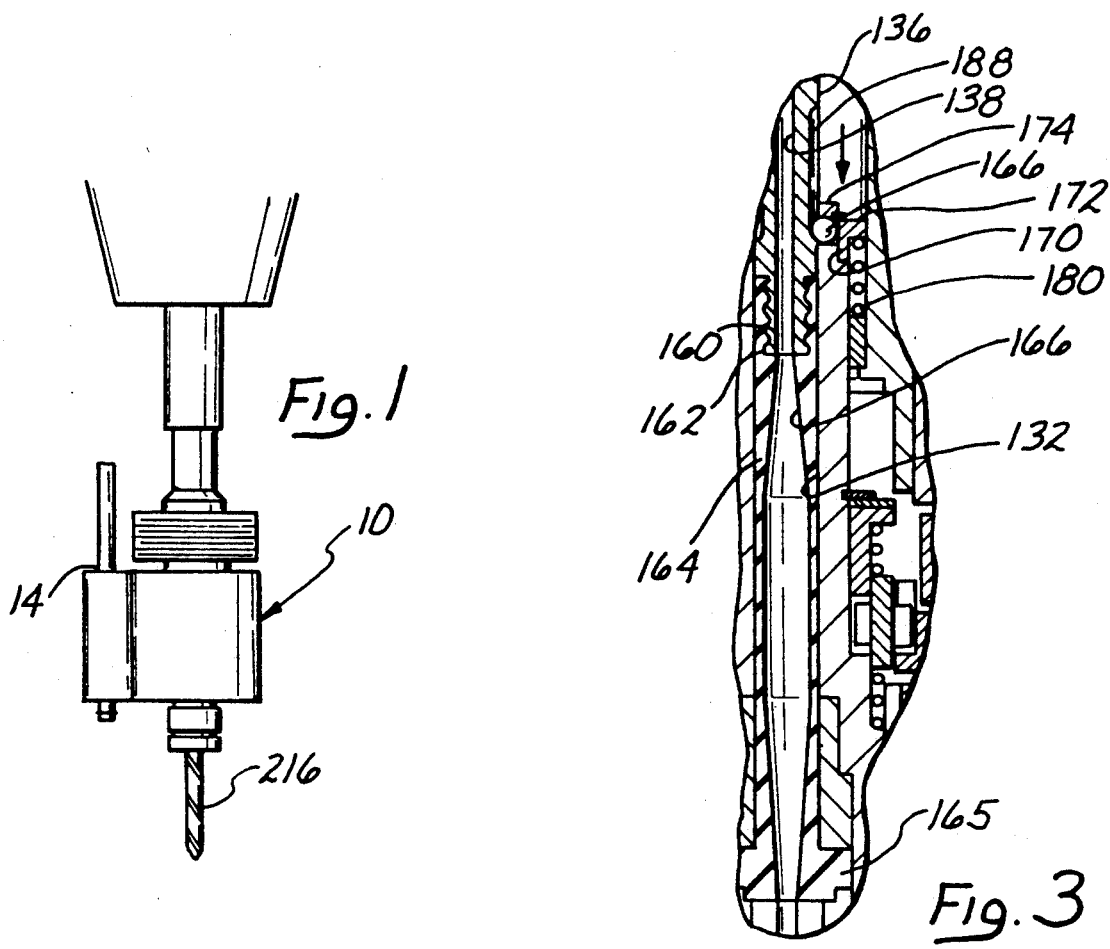
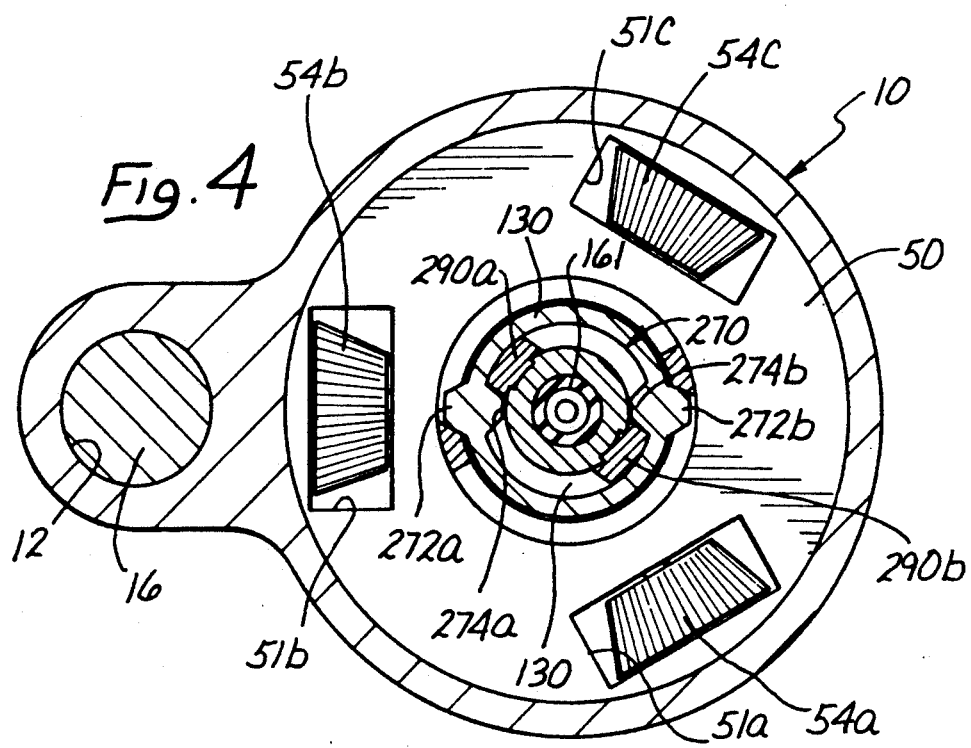

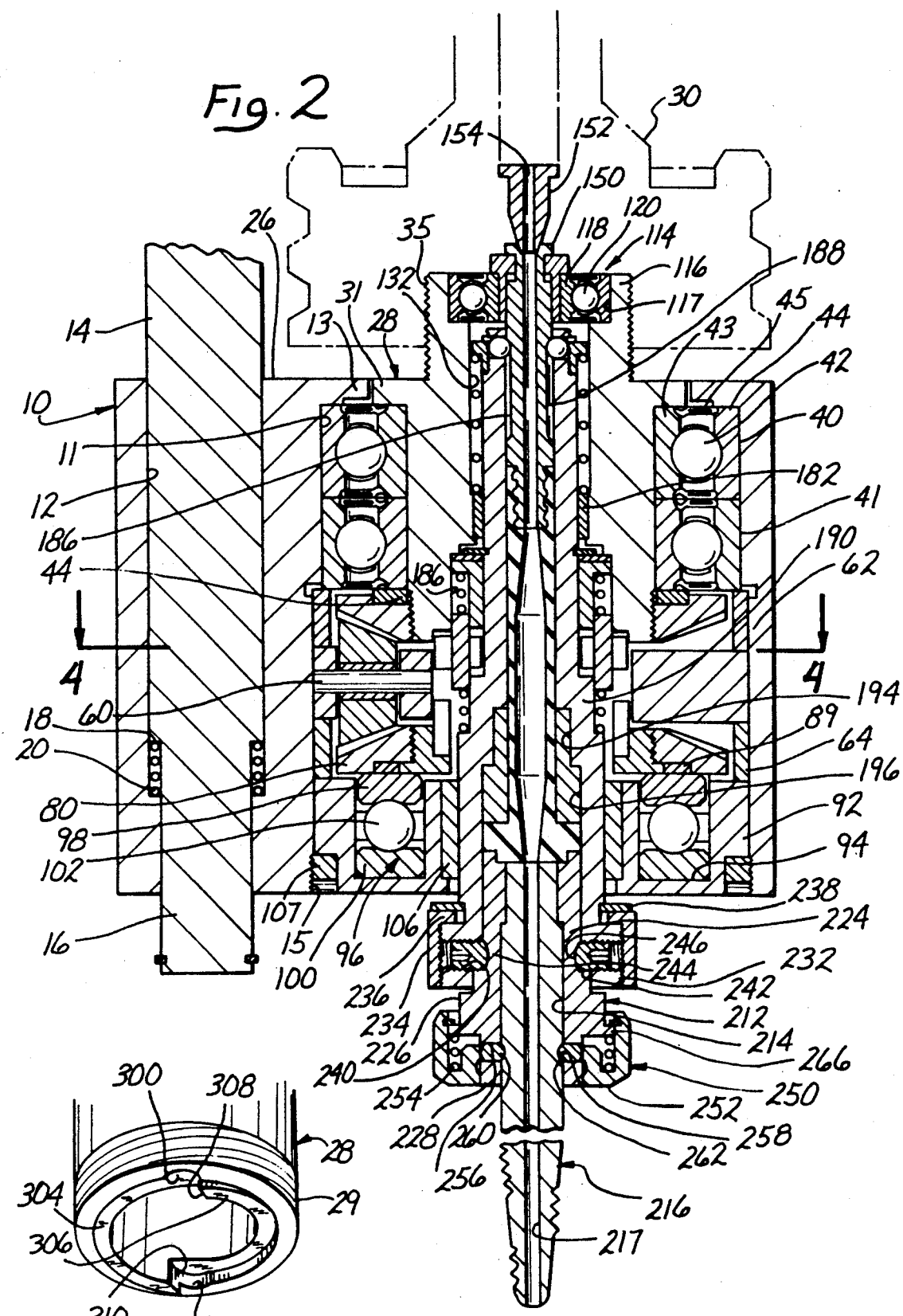

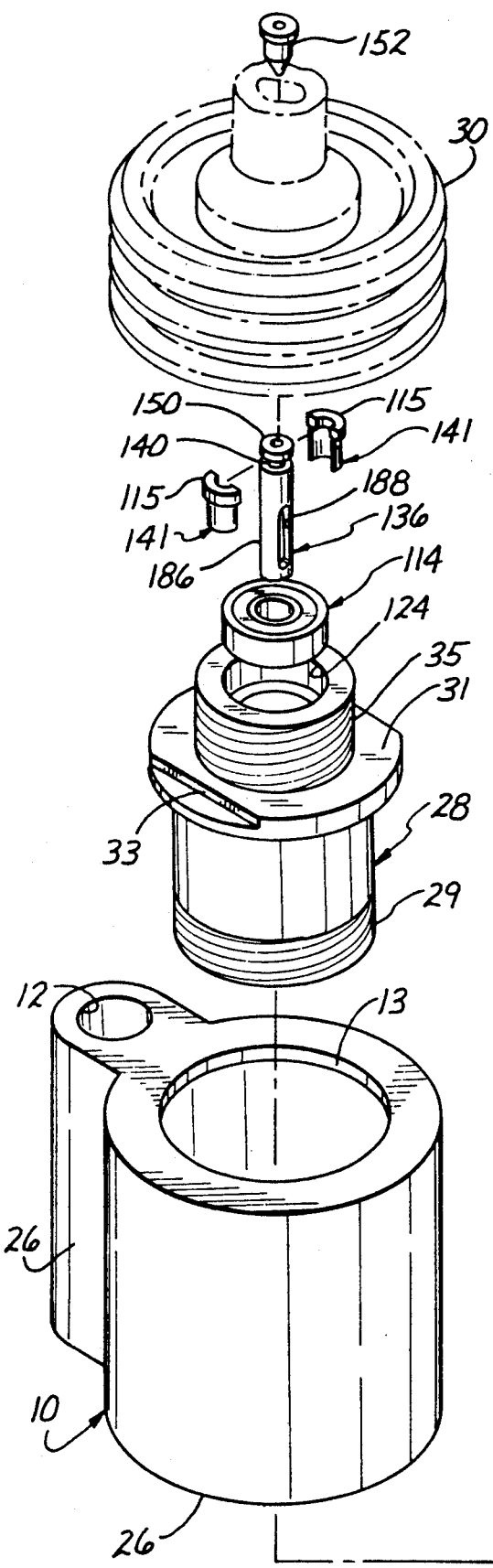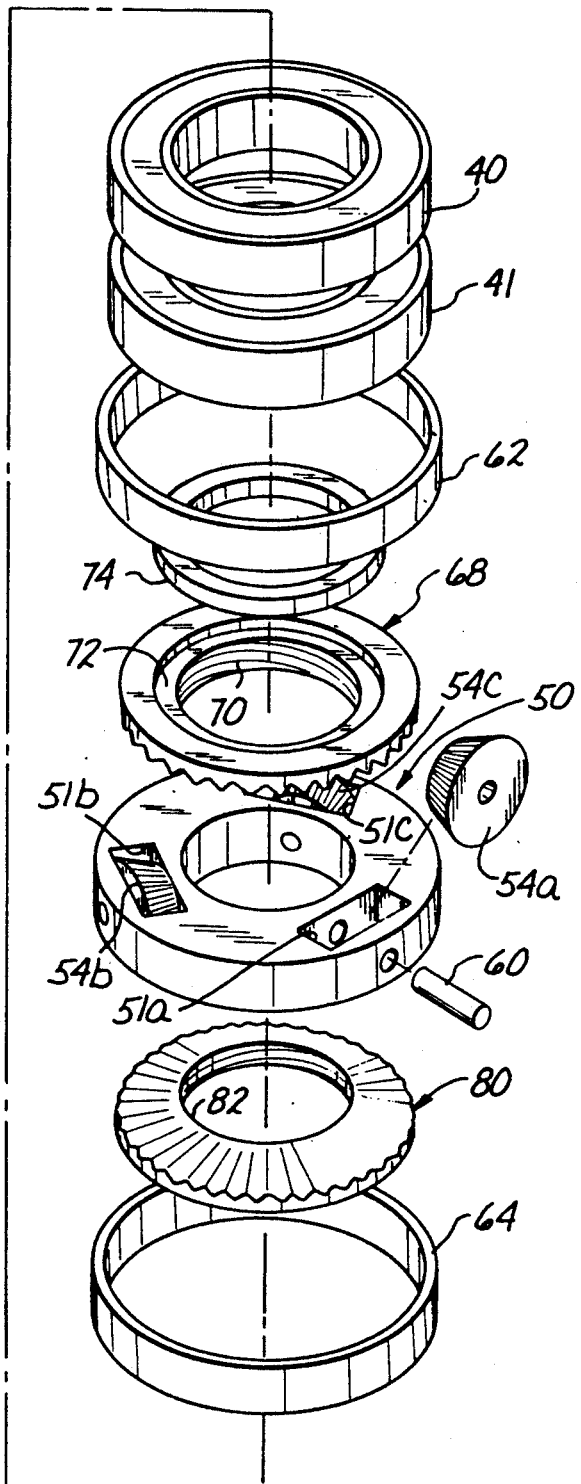
Fig. 6a

TAPPING ATTACHMENTS

This is a continuation-in-part of co-pending application Ser. No. 07/330,752 filed Mar. 30, 1989, now abandoned, the filing date of which is claimed for subject matter common to said application and the instant application.

BACKGROUND OF THE INVENTION

1. Field of the Invention

The field of the invention is that of tapping attachments, that is, components which carry a tap for threading holes and which are driven by some type of driving machine.

2. Description of the Prior Art

The field of the invention is exemplified by prior art patents of the herein inventor, including U.S. Pat. Nos. 3,397,588; 3,472,347; 3,717,892; 3,946,844; 3,999,642; 4,014,421; 4,029,429; and 4,067,424.

The prior art patents deal with tapping attachments which have a body and a drive spindle which carries the tap. The body of the attachment is driven by some form of driving machine, and drive is imparted from the body to the spindle. The prior patents relate in part to the clutching means as between the body and the spindle for direct drive and also for reverse drive.

The prior art patents do not embody certain improvements which are present in the herein invention which are particularly adapted to what may be called attachments for heavy duty and which are outlined more specifically hereinafter.

A further characteristic which is not present in the prior art patents is that of providing for relative axial extension of the tapping spindle and the tap which is held by it. The nature of these characteristics or improvements which are not present in the prior art patents is explained in detail hereinafter.

With respect to the prior art, in the prior art an attempt has been made to provide for a flow of coolant using a coil of flexible plastic tube but, of course, in a direct drive machine, it involves rotation in only one direction, so that this has not been done in a reversible type of attachment.

In addition, in the prior art provision has not been made for a flow of coolant at high pressure through the use of flexible tube associated with coolant flow for use in a reversible type of tapping attachment.

SUMMARY OF THE INVENTION

The tapping attachment of the invention has similarity and is of a type similar to that of previous patents such as, for example, U.S. Pat. Nos. 3,397,588; 3,717,892; 3,946,844; and 4,014,421. Attention is called particularly to these prior art patents as well as the others enumerated in the foregoing, and these patents are hereby incorporated herein by reference.

The tapping attachment of the herein invention is one particularly designed to be one capable of heavy duty and for duty at high speeds. One of the purposes of the invention is to achieve a greater efficiency in this type of apparatus operating at high speed.

The tapping attachment of the invention is particularly an improvement in the area of CNC computer control, that is, Computer Numerical Control of the driving machine for the attachment.

The invention can be understood by way of having an understanding of CNC computer control. When the tap is brought out of the hole after tapping, for example, in direct drive, that is, tapping a thread, it of course must be brought out far enough so that the machine can move the tapping attachment and the tap to the next hole. There is a plane called the "clearance plane" which is that particular plane that the attachment and the tap have to be brought to in a vertical direction before it can be moved under computer control to the next hole.

Various advantages accrue from the herein invention, one of which is that a savings in time is realized in getting the attachment and tap up to the clearance plane. Another improvement is the improvement in efficiency realized by reason of the difference in relative angular movement as between driving dogs and clutching members or splines, both in direct drive and reverse drive.

Typically in the prior art, the transfer members, that is, the drive members, as between the body of the attachment and the spindle have been balls in a ball race rather than dogs, this being true both in direct drive and in reverse drive. In the herein invention, the transfer members, that is, the driving dogs, that transfer drive from the body of the attachment to the spindle are rigid dogs or drive members which may be square, or preferably rectangles or trapezoid shapes, with the result that only a very small amount of movement is necessary to change from drive, that is, engagement with one set of clutch members or parts to engagement with another set of clutch members or drive parts. Preferably, the dogs have slanted sides or are trapezoidal in shape which accomplishes this purpose in limiting the amount of axial movement that is necessary for purposes of engagement and disengagement.

There is a rate of movement which is known as the feed rate, which is the rate at which the tap is advancing in the operation of threading a hole. When the tap is brought out of the hole and has to be moved to the clearance plane, it moves at that rate. There is a slow feed rate from a point just above the hole as the tap is tapping into the hole, and there is another more rapid rate when the attachment and tap are being lifted under computer control to the clearance plane for moving to the next hole. There is a slow feed rate, as is stated above, just before the tap gets into the hole and after it gets into the hole, and there is a much faster vertical rate of movement after the tap is out of the hole as the tap is being lifted to the clearance plane for angular movement under the control of the computer to the next hole. One of the advantages of the invention is a realization of improvement with respect to these movement rates.

Another advantage of the herein invention is that there is a considerably greater area of engagement as between the dogs and the clutch members or splines as compared to the ball engagement where there is only point contact, so that with that limited contact, there is much more danger of affecting the character of the contacted metal parts known as "brinelling".

The invention has possible applications to drive of other instrumentalities, that is, other than a tap for threading holes.

Objects of the invention include realization of the advantages specifically set forth in the foregoing.

The herein invention embodies a further improvement which resides in a flexible tubular connection between the spindle and the tap which is carried by, and driven by, the spindle. There is provided a bore extending through the drive of the attachment, all the way through the tap, and out through the end of the tap. Coolant is provided which flows through this bore, and the coolant is under pressure so as to force chips out of the hole that is being tapped. The machine itself, that is, the driver for the attachment, has parts in it that are necessary to urge the coolant into the bore in the rotating parts. When going from direct drive to reverse drive, there is relative axial movement between the spindle and the tap, that is, the drive spindle can move axially while it is suspended in the attachment while the tap is in the hole and cannot move. Constant contact is made with the coolant input by way of a rubber stop which allows rotation of the spindle. The stop has sliding engagement with the bore in the tube insert which is in the spindle in reverse drive. There is allowed the relative axial movement as between the spindle and the tap so that at all times, the coolant can be supplied under pressure. One of the objects of the invention is to provide improved means for providing for the supply of the coolant and necessary relative axial movement as described. A further object of the invention is to afford the capability of providing a flow of coolant to the tap in high pressure applications.

With respect to specific objects of the invention, the realization of advantages as set forth in the foregoing constitutes objects, and further objects and advantages will become apparent from the following detailed description and claims.

BRIEF DESCRIPTION OF THE DRAWINGS

FIG. 1 is a schematic showing of the attachment of the invention being driven from a driving machine;

FIG. 2 is a cross-sectional view of a preferred form of the invention;

FIG. 3 is a partial cross-sectional view showing a flexible tube and its attachment to a tube insert in accordance with the invention;

FIG. 4 is a cross-sectional view taken along the line 4—4 of FIG. 2;

FIG. 5 is a detail view of the clutching configuration and splines for direct drive;

FIGS. 6a and 6b are exploded isometric views of the mechanism of FIGS. 1, 2, 3, 4 and 5.

Figure 6B:
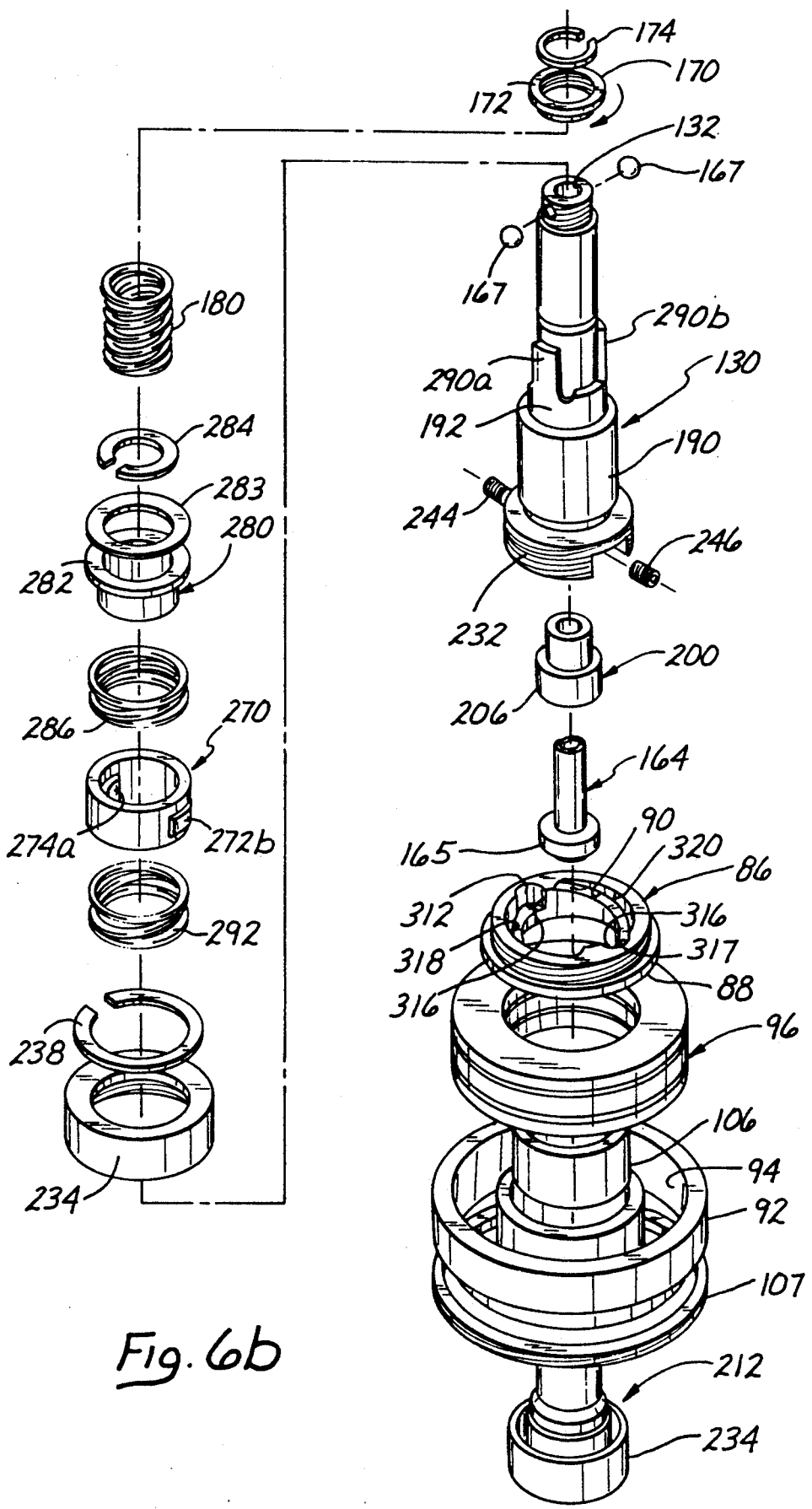

DETAILED DESCRIPTION OF A PREFERRED FORM OF THE INVENTION AND PREFERRED METHOD OF PRACTICE

Reference should be made to the cross-sectional assembly view, FIG. 2, and FIGS. 3, 4, 5, 6a and 6b. The description will start with the outer or outside parts of the attachment and then proceed inwardly to the more inner parts and from the top down as shown in the drawings.

Briefly, at the outset, the invention is in the form of a tapping attachment having a body and having a spindle within the body which can be rotated in one direction for direct drive and the opposite direction for reverse drive. A tap, that is, a tool for threading is carried at the lower end of the spindle. The spindle is mounted to be capable of relative axial movement as well, as will be referred to more in detail presently.

Numerals for smaller parts may appear only on FIGS. 3, 4, 5, 6a and 6b. The body of the attachment is designated by the numeral 10, the body being of cylindrical configuration. At one side of the body there is a bore as indicated at 12, within which is a holding stem 14, which connects to the driving machine, as already known in the art and as shown in FIG. 1, to restrain the body against rotation. The member or stem 14 has a lower part 16 of smaller diameter providing an annular shoulder 28, and between this shoulder and at the bottom of the bore 12 is a coil spring as so shown. This allows for some axial movement of the stem or member 14. Body 10 has a bore 11 and top inwardly extending flange 13. The bottom of bore 11 is threaded as shown at 15.

The outer part of the attachment which is held against rotation is designated by the numeral 26, and the inner part which is subject to rotation is designated by the numeral 28. Part 28 is within part 26 and it has external threads 29 at the bottom. Part 28 has a flange 31 with flats 33 and upper threaded part 35 received in part 30.

Numeral 30 designates, in outline, the driving machine or the part of the driving machine which is positioned to carry the attachment and to drive, that is, to rotate the part of the attachment that is rotated. The machine or driving machine can be any of various types as already known in the art.

Part 26 has a bore 11, an inwardly extending flange 13 at the top and a threaded bore 15 at the bottom, as explained. The lower part of bore 11 is a counter bore of slightly greater diameter. The part 28 which is rotated has a bore 124, and extending flange 31 is positioned closely to the edges of the flange 13 at the top of the body of the attachment 26.

Positioned between the body 26 of the attachment and the cylindrical member or part 28 are two ball bearings designated at 40 and 41. There are two bearings for purposes of improved stability. Each one of these bearings, such as the one designated at 40, includes balls at 42 and parts 43 and 44 having ball races between which the balls can rotate. Seals are provided such as shown at 45 which seal the bearings. The ball bearings and seals in the two bearings are alike so that they need not be described in further detail.

Below the bearings there is provided within the body 26 the parts of a reversing mechanism whereby the spindle can be driven either in direct drive or reverse drive, as will be described more in detail presently. The reversing mechanism includes a cage as designated at 50 as may be seen in the assembly view as well as in the other figures. The cage 50 is of circular configuration and fits within the body 26 as shown. The cage has within it slots or openings as designated at 51a, 51b and 51c, and positioned in each one of these openings is a bevel pinion gear as shows at 54a, 54b, and 54c, for purposes of providing for the reverse drive. See FIGS. 4, 6a and 6b. Each of these gears has a shaft or arbor, one of which may be seen at numeral 60, all of these gear shafts being alike. These gear shafts are of course journalled in parts of the cage 50. Spacer rings 62 and 64 are provided above and below the cage 50 and on the inside of the body 26 as shown.

The bevel pinion gears are in the position of planetary gears. Numeral 68 designates a ring gear having a threaded bore 70 and which is threaded onto the lower part of the cylindrical member 28 previously described. This gear is also a bevel gear constructed and positioned to be able to drive the bevel pinion gears 54a, 54b and 54c. The ring gear 68 has a rectangular annular groove 72 in it, and fitting in this groove is a spacer ring 74.

Numeral 80 designates another bevel gear which is a ring gear positioned so that it can mesh with the three bevel pinion gears 54a, 54b and 54c. The bevel ring gear 68 is mounted to rotate about the spindle as will be described. The ring gear 80 has a threaded bore 82 as shown, and mounted within this bore is a ring member 86 which has a lower external flange part 88 that fits against the lower part of the ring gear 80. See FIG. 6b. This part 86 has an internal configuration 90, as may be seen in FIG. 6b, which forms a clutch member or a spline member which is adapted to be engaged, as will be described, by a dog or dogs for purposes of transmitting reverse drive to the spindle, the drive being transmitted through the ring gears and the bevel pinion gears as already described and as will be referred to more in detail presently.

Within the body member 26 is a circular or ring-shaped member 92 having a ring-shaped or annular opening in it as designated at 94 which receives a thrust bearing as designated at 96. The thrust bearing includes ring members 98 and 100 which form a ball race for balls as designated at 102. The bevel ring gear 80 and the clutch part 86 bear against ring 89, the top member 98 of the thrust bearing which is able to rotate and to take up thrust exerted by the bevel ring gear 80.

Positioned inside the annular opening 94 is a bushing 106 within which the spindle rotates, as will be described.

The lower part of member 92 has a portion of smaller diameter as shown, and fitting around this diameter is a ring member 107 which is threaded into threads at the lower part of the bore 11 in the body 26.

Part 28 has an upper threaded section of smaller diameter as designated at 35, at the upper end of which is bearing 114 in a counterbore 117 to accommodate rotation of the spindle. The bearing has parts 116 and 118 forming a ball race for balls 120, the bearing being sealed by upper and lower seal members similar to those previously described, and identified as 45 in FIG. 2.

The part 28 has a bore as designated at 124 for accommodating the spindle, as will be described. At the lower part of the member 28 there is a counterbore of larger diameter as designated at 132 which will be referred to again presently in connection with the description of the spindle. The spindle itself will be next described.

Description of the Spindle

The spindle as a whole is designated by the numeral 130. See FIG. 6b. The spindle 130 has a bore 132 in its upper part. Fitting into the upper part of the bore is an insert member 136. See FIG. 3 and FIG. 6a. The insert member has a bore 138 in it. At the upper end of the insert, it has a smaller neck part 140 having an end flange 142. Fitting around the upper end of the insert 136 is a sleeve member 141 which is a split member being in two parts being split axially. This part fits inside of bearing 114. The two parts together form a circular part, the upper end of which is enlarged as shown at 115, so that these parts can be fitted together around the neck 140 of smaller diameter at the upper end of the insert 136. At the upper end of the insert member is a ring-shaped part 150 having a tapered bore. Numeral 152 designates a rubber plug having a bore 154 which fits into the part 150 having a tapered bore. The lower tapered part of the rubber plug member 152 has sliding engagement with the tapered bore in the part 150 for sealing which is necessary during reverse drive, as will be explained presently.

The lower part of the insert 136 as designated at 160 is of smaller diameter, having a plurality of annular ridges as designated at 162. See FIG. 3. These ridges are adapted to provide a fit with sealing engagement with a flexible tube element 164 having a bore 166 that aligns with the bore 138 in the insert member 136 as shown, the tube member having annular internal grooves to engage the annular ridges 162 on the insert 136. The purpose of the flexible tube, which may be made of Neoprene, will be described more in detail presently. It has an enlarged end 165.

Construction is provided whereby the spindle 130 can move axially relative to the insert 136. To accommodate the relative axial movement, at the upper end of the spindle 130, it is of smaller diameter as shown and threaded, this part having radial holes or openings accommodating balls 167 and 169. See FIG. 6b. Surrounding the balls is a ring member 170 having a radial flange as shown at 172. See FIG. 3. Numeral 174 designates a snap ring holding the flanged ring in position relative to the balls, the ring having a part fitting into an end part of the spindle 130 of smaller diameter as shown in FIG. 2.

Numeral 132 designates the bore within the part 28 in which is positioned a coil spring 180, the upper end of which engages the flange 172 on the ring member 170 and the lower end of which engages a shoulder at the end of the bore 132 and the part 182. The insert number 136 has axial slots 186 and 188 in its sides to accommodate the balls 167, 169. As may be seen, the structure as just described allows for relative axial movement as between the spindle 130 and the insert member 136.

The spindle 130 extends downwardly through a counterbore of larger diameter 132 in the end of part 28. At this part of the spindle is provided the mechanism for clutching and declutching in direct drive and reverse drive as will be described.

The lower part of the spindle 130 is of larger diameter as indicated at 190, and just above this part is a portion of smaller diameter 192 but larger than the upper part of the spindle. At this intermediate part of the spindle is provided the clutching mechanism for providing for clutching engagement and disengagement for purposes of direct drive of the spindle and clutching engagement or disengagement for purposes of reverse drive of the spindle, as will be described more in detail presently. See FIG. 6b and FIG. 2.

Within the spindle 130 in addition to the bore 132 is a counterbore 194 of larger diameter and another counterbore 196 of still larger diameter which extends to the end of the spindle. Within the counterbores 194 and 196 is a sealer member 200 fitting in bores 194 and 196 through which the flexible tube 164 made of Neoprene extends. See FIG. 6a. The tube 164 has a portion of larger diameter at the lower end as designated at 165, and the sealer member 200 fits against this portion of larger diameter in sealing engagement.

Fitting within the end of the bore 196 of the spindle 130 is the tap holder 212 itself. The tap holder 212 has a bore 214 to receive the tap 216 itself, the end of the tap coming up against the enlarged end 206 of the flexible tube 164. The tap holder itself has a bore 214 that aligns with the bore within the flexible tube 164. As previously pointed out, coolant is normally provided through the bore in the spindle in the tap during all operations, the pressure of the coolant serving to eject cuttings from the bottom of the bore in the piece being worked on.

The tap holder 212 has an upper part of smaller diameter as indicated at 224 and a lower part 226 of larger diameter, and then a still lower part of smaller diameter as indicated at 228. The spindle has a larger end part as designated at 232, the outer surface of which is screw-threaded to receive a screw cap 234, having a flange 236 as shown, which fits against a snap ring 238. In the extending part 232 are threaded holes on opposite sides, as indicated at 240 and 242, which receive screw members 244 and 246, the ends of which fit into sockets in the side walls of the tap holder 212 whereby it is held in position. The threaded ring or cap 234 covers the holes 240 and 242 when it is in position.

At the end of the tap holder 212 is a quick change device 250 providing for quick and easy change from one tap to another (not shown in FIG. 6b). The quick change mechanism 250 includes a ring member as shown and designated at 252, having an internal configuration inside of its side parts which receive a coil spring 254 which normally urges the ring member in an outward direction. In side walls of the tap holder 212, near the end, are oppositely disposed bores 256 and 258 which receive radial pins 260 and 262 which can be held in position by the inner part of ring member 252, the ends of the pins being received in sockets in the side walls of tap 216, the pins being normally held by the inner portion of the ring member 252. The upper end of the ring member 252 has a snap ring fitting on the inside of it which engages with an extending flange 266 on the tap holder.

On the inside portions of the ring member that engage the radial pins 260 and 262 are depressions so that the ring member 252 ban be manually pushed upwardly to allow the radial pin members to move outwardly into the depressions or sockets as formed on the inside of the inner portion of the ring member, thus allowing the tap to be removed and another one to be substituted for it, the spring-biased ring member 252 being allowed to come back into a position as shown in FIG. 2. Tap 216 has a bore 217 aligned with the bore in the flexible tube 164 and the insert 136.

Clutching Mechanism for Direct Drive and for Reverse Drive

Normally, the attachment while in direct drive rotates the spindle as it threads into the previously formed hole. Coolant is supplied during operations. When the proper depth has been reached, the driving machine lifts the attachment, the tap still being in the hole. This is allowed by reason of the construction for relative axial movement as between the attachment itself and the spindle. This movement causes the direct drive clutching means to disengage and the reverse drive clutching means to engage with only a very limited amount of movement. The clutching means may be seen in FIGS. 2, 3, 4, 5, 6a and 6b, and in the cross-sectional view of FIG. 4.

FIGS. 2, 4 and 6b illustrate the dog ring, which is identified by numeral 270. This ring has rigid dogs extending radially outwardly and radially inwardly, the dogs being on opposite sides of the ring, the outside dogs being designated the numerals 272a and 272b and the inwardly extending dogs being identified by the numerals 274a and 274b. The dogs are rigid and preferably have a shape as may be seen in FIG. 4, which is a shape wherein the dogs have flat sides which facilitate the engagement and disengagement, as will be described.

In FIG. 6b, numeral 280 designates a sleeve on the spindle 130, the sleeve having an extending flange 282 and the sleeve being held in position upwardly by a snap ring 284, there being a seal member 283 in between the flange 282 and the snap ring. Bearing upwardly against the flange 282 is a coil spring 286, the lower end of which acts on the dog ring 270.

At the position of the dog ring 270, the spindle 130 has two axial splines as designated at 290a and 290b, there being space between the splines. See FIG. 4. In FIG. 2, just below the dog ring, the spindle 130 has a portion 192 of larger diameter. Surrounding this part is a coil spring 292 which bears against the lower side of the dog ring 270. See FIG. 6b. Thus, it is seen that the dog ring is resiliently mounted or accommodated with respect to the spindle in order to facilitate engagement and disengagement with respect to direct drive and also with respect to reverse drive.

For purposes of direct drive, the lower end of the part 28 has a clutching construction for engagement with the outer dogs 272a and 272b. This construction may be seen in FIG. 5. Formed in the lower end of the part 28 are recesses as shown at 300 and 302 which have one straight side with ramps 304 and 306 leading up to the recesses, so that in direct drive, the output of the extending rigid dog members 272 can engage against the slanted sides 308 and 310 at the ends of the ramps. In direct drive, the attachment has moved downwardly with respect to the spindle to provide for direct drive clutching engagement.

The inner dogs 274a and 274b normally engage splines 290a and 290b in both direct and reverse drive.

As pointed out, when the tap reaches the bottom of hole, the machine lifts the attachment upwardly while the spindle is held by reason of the tap being in the hole. When the attachment is raised, the driving dogs 272 on the outside of the dog ring 270 come into engagement with clutching means for reverse drive.

On the inside of the lower bevel gear 80 is a ring member 86 which is threaded on the outside to be threaded to the inside of the bevel gear 80. See FIG. 6b. The ring member 86 has an outwardly extending flange 88 which fits underneath a ring 89 on the lower side of the bevel gear 80. The configuration of the clutching means on the inside of the member 86 can be seen in FIG. 6b. The configuration is similar to that for direct drive. As shown in FIG. 6b, two oppositely disposed recesses may be seen as shown at 312 and 314, each having a slanted side 316 and 317 with ramps 318 and 320 leading up to the openings. The straight sides operate in the manner of splines. The rigid dogs on the outside of the dog ring 270 come down and engage the configurations in the ring member 86. The dogs can move up the ramps into the openings and against the sides 316 and 317 of the ring member 86. The device is then in reverse drive, and the spindle is rotated in a reverse direction for rotating it out of the tapped hole.

At all times, both during direct drive and reverse drive, coolant is provided from the driving means down through the bore in the plug member 162, the insert member 136, and the flexible tube 164, down into the tap itself. The coolant flowing down through the bores under pressure will serve to remove chips from the bottom of the tapped hole.

At any time, the operator may manipulate the quick change mechanism 250 at the lower end of the tap holder 212 and may insert another tap. The quick change mechanism is a device known in the prior art.

From the foregoing, those skilled in the art will readily understand the operation of the invention from the description as set forth in the foregoing. The operation may be briefly summarized as follows. The attachment is driven by a driving machine, which may be any of various types, the body of the attachment normally being held from rotation, as already described.

Rotation is transmitted from the rotating part of the attachment to the spindle initially for direct drive. At this time, the attachment is moved downwardly axially with respect to the spindle carrying the tap, bringing the driving dogs into engagement for direct drive of the spindle, as described in the foregoing.

When the tap reaches the bottom of the tapped hole, the driving machine moves the attachment upwardly, and it moves upwardly relative to the spindle by way of the means as described in the foregoing. The driving dogs on the driving ring now come into engagement with the clutching means or splines on the reverse drive gear so that reverse drive, that is, drive in the reverse direction, is transmitted to the spindle for rotating it out of the tapped hole.

The dog ring is resiliently mounted by way of springs as described to facilitate the clutching and declutching movements. At all times, the coolant is supplied through the bores as described down into the bore and the tap itself.

In describing the embodiment of FIGS. 7, 8, parts that are the same as those in the embodiment described in connection with FIGS. 1-6, will be given the same reference numerals.

In the discussion which follows, only general references will be made as necessary to the structure disclosed and discussed in detail in connection with FIGS. 1-6, inclusive, hereinabove, and specific details will be provided only where necessary to augment that disclosure with respect to the alternative embodiments of the invention depicted in FIGS. 7,8.

Figure 7:
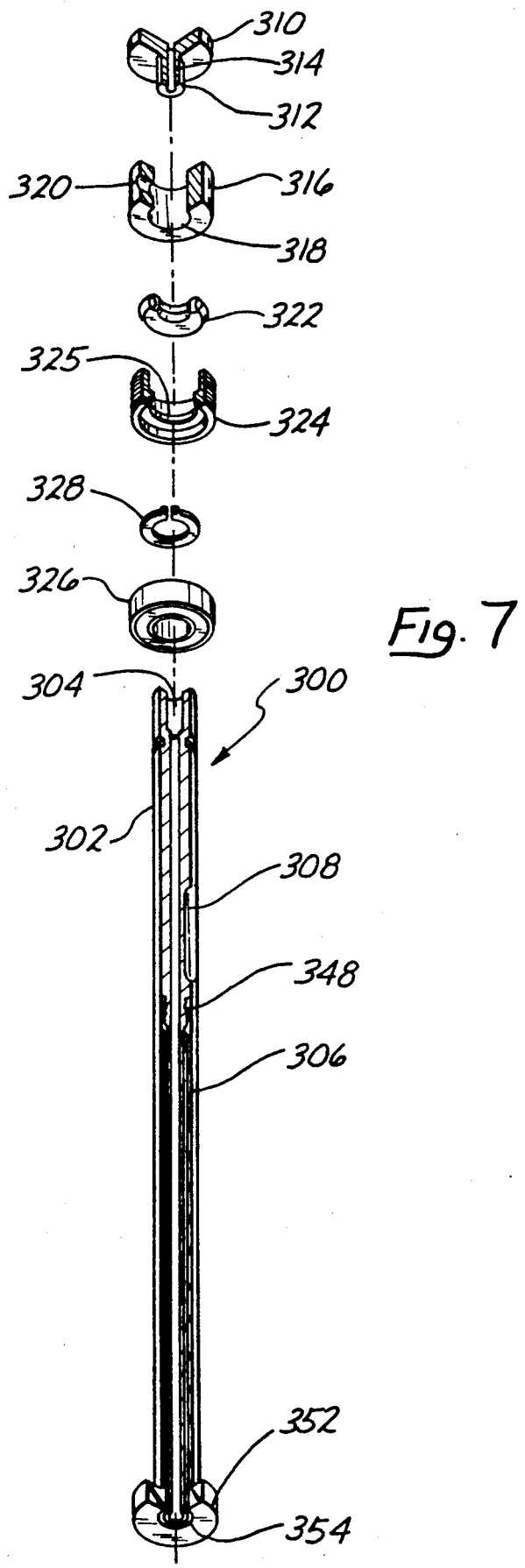
FIG. 7 is an exploded isometric view of an alternative embodiment of the invention particularly applicable to high coolant pressure applications.
Figure 8:
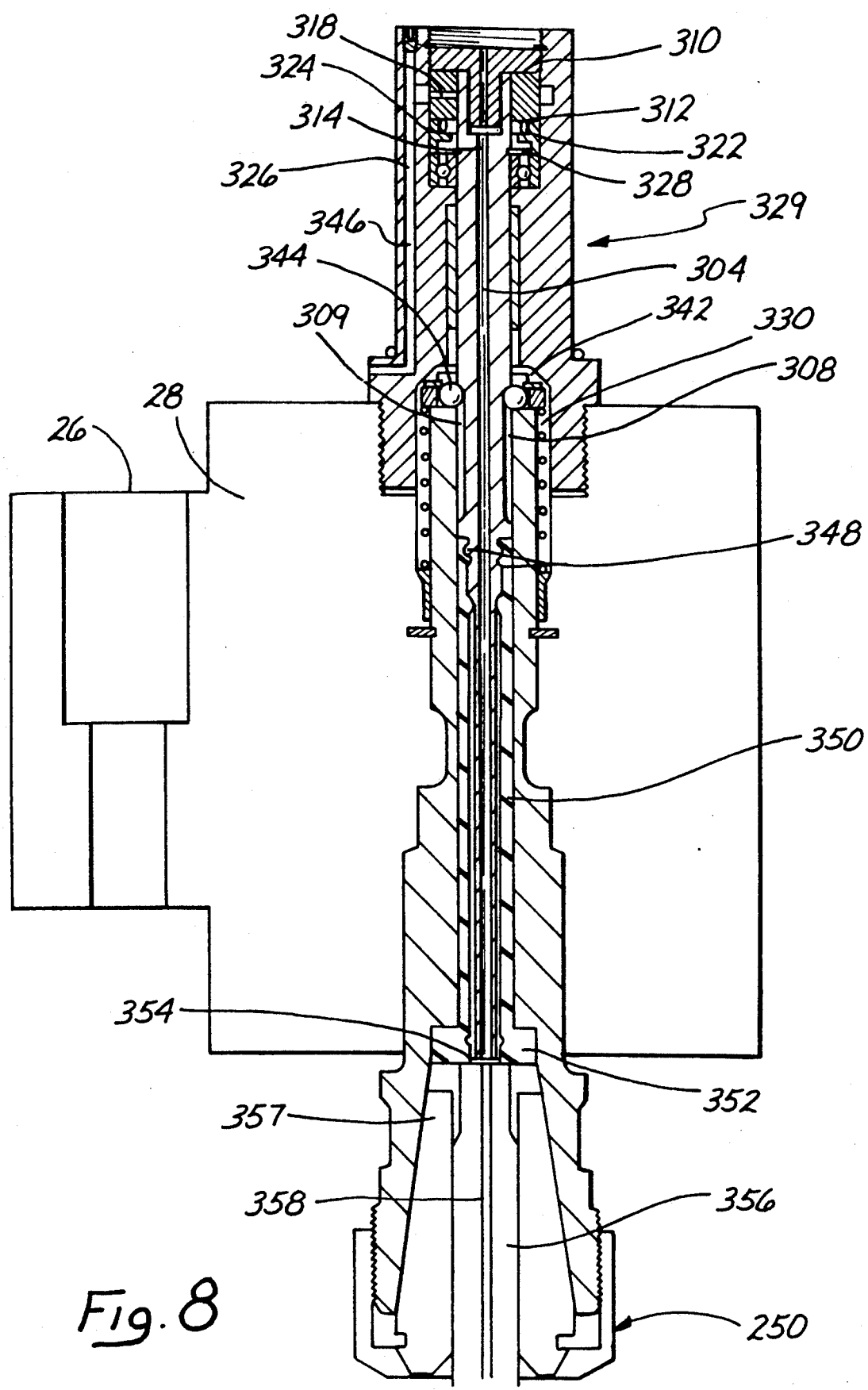
FIG. 8 is a cross-sectional view of the invention depicted in FIG. 7.

As depicted in FIGS. 7, 8, an alternative embodiment of the invention is employed in connection with high pressure coolant. An insert 300 comprises a rigid conduit tube 302 defining a fluid flow passage in the form of a bore 304. Disposed upon a lower portion of tube 302 is flexible tube element 306 having generally the same characteristics as the part 164 described and depicted in connection with FIGS. 1-6, inclusive. Defined at the periphery of conduit 302 are a pair of slots 308, 309 for accommodating axial movement with respect to the insert 300 in the same manner as slots 188 described in connection with FIGS. 1-6, inclusive.

An inlet member 310 includes a nozzle 312 with a bore 314 defined therein. Annular fitting 316 defines a central bore 318 alignable with bore 314 in the assembled condition. Defined in fitting 316 is a peripheral slot 320 whose function is to act as a pressure relief passage. Inlet member 310 is fittable into and engageable with fitting 316.

A sealing member 322 is sealably engageable with inlet member 310, to seal coolant from the remainder of the mechanism. A seal holder member 324 having a central bore 325 is configured to be engageable with sealing member 322 to hold the latter in place.

Sealing member 322 and seal holder 324 are generally annular in configuration with their central bores alignable to accommodate passage therethrough of coolant fluid (not shown). Member 310 fits into fitting 316.

Fitting 316 fits inside bearing 326, the two parts together forming a circular part. Annular bearing 326 accommodates motion of insert 300. A snap ring 328 retains insert 300 above bearing 326.

FIG. 8 is a cross-sectional view, somewhat fragmentary, of an insert member 300 within a spindle 329 in accordance with the invention. Spindle 329 is held within the tapping attachment 10 and is connected to a driving machine as described hereinabove with respect to FIGS. 1-6, inclusive.

In the same manner as described in connection with FIGS. 1-6, inclusive, spindle 329 is connected to a driving machine (not shown). Spindle 329 defines a bore 330 for receiving insert member 300. Slots 308, 309 are configured to accommodate balls 342, 344 to permit relative movement between the spindle 329 and the insert 300, in the same manner as described and depicted hereinabove in connection with FIGS. 1-6, inclusive. Spindle 329 defines an exit orifice 346 for providing a path to ambient of back pressure coolant from passage 318, and is connected thereto.

An intermediate portion of insert 300 defines a plurality of annular ridges 348. A flexible tubular member 350 is disposed around and in resilient engagement with conduit 302. A sleeve 354 attached to enlarged portion 352 of tubular member 350 slides vertically on the tube 302 when spindle 329 moves axially and tube 350 stretches.

In the same manner as described hereinabove, a tap 356 is attached to spindle 329 via a tap holder 357. Tap 356 defines a central bore 358 for passage of coolant. A quick change mechanism 250 as described above is coupled to tap holder 357 to effect rapid change of taps in the depicted mechanism.

In operation, it is particularly important in applications involving both pressure coolant, that back pressure be controlled. Otherwise, sealing member 322 is exposed to risk of rupture, which could release coolant into the rest of the mechanism with obviously undesirable results.

In many applications, the cross-sectional area of bore 304 of tube 302 is equal to or slightly smaller than that of bore 358 in tap 356, thus substantially avoiding potential back pressure. In some applications, however, the cross-section of the tap bore 358 may be smaller than that of the bore 304. In this case, there would be a potential problem with back pressure of the coolant. In accordance with the invention, back pressure is relieved by expulsion of coolant to ambient through passage 314 and orifice 346, thereby preserving the integrety of sealing member 322.

From the foregoing, it will be readily understood as to the manner in which the invention achieves all of the objects and advantages all of the objects and advantages set forth in the foregoing. The foregoing disclosure is representative of a preferred form of the invention and preferred mode of utilization. The disclosure is to be interpreted in an illustrative rather than a limiting sense, the invention to be accorded the full scope of the claims appended hereto.

What is claimed is:

1. In coupling means for transmitting torque, in combination, a first rotating member, a second rotating member, said members being relatively movable axially, means for transmitting rotary drive from one member to the other, said means including an axially movable driving member positioned between said rotating members and including at least one dogging part, both of the rotating members having at least one clutching part engageable in engaging position in surface-to-surface contact with said at least one dogging part of the driving member whereby drive is transmitted through the driving member, said driving member having a plurality of dogging parts extending radially inwardly and outwardly for engagement with the clutching parts, said dogging parts having at least one slanted side surface for limiting the amount of axial movement required to move between engaging position and disengaged position.

2. The invention as set forth in claim 1, wherein said driving member is carried by the second rotating member and further including resilient means bearing upon said driving member providing for limited axial movement of the driving member.

3. Coupling means as in claim 2, said resilient means comprising at least one spring member, whereby the driving member is quickly repositionable upon engagement with and disengagement of said dogging parts relative to said clutching part parts.

4. Coupling means as in claim 1, wherein a tapping attachment carries a spindle member and further including means for transmitting reverse drive to said driving member, the reverse drive means including at least one clutching part engageable with said driving member, said spindle member having a bore, and further including stretchable means positionable within said bore of said spindle member, said stretchable means being tubular for passage of coolant fluid therethrough and being stretchable to accommodate relative axial movement between said first rotating member and said spindle member.

5. In a tapping attachment for transmitting drive to a tap having, in combination, a first rotating member connectable to a source of rotational drive, a second rotating member axially aligned with said first rotating member, said members being relatively movable axially, means for transmitting rotary drive from one member to the other, said second member comprising a spindle member having means for carrying a tap having a bore for circulating a coolant to the tap, said bores being positionable and alignable for said purpose, means to accommodate relative movement between said spindle member and said first rotating member, said means to accommodate relative movement between said spindle member and said first rotating member including a flexible tubular member forming part of said bore in said spindle member whereby the first rotating member is movable relatively to the tap and providing for continuous transmission of coolant to the tap, and further including a rigid conduit member disposed within said flexible tubular member.

6. A tapping attachment as in claim 5 wherein said spindle member defines at least one pressure relief orifice for passage of coolant therethrough to prevent back pressure thereof.

7. The invention as set forth in claim 6, further including an insert member having a bore within said spindle member and means for engaging between said spindle member and said insert member, whereby rotation can be imparted to said spindle member while allowing said insert to move axially relatively with respect to said spindle member, wherein said insert member defines a slot alignable with said pressure relief orifice of said spindle member for permitting flow of coolant from said insert member to said pressure relief orifice to relieve back presure of said coolant.

8. In a tapping attachment, coupling means for transmitting torque having, in combination, a first rotating member, a second axially aligned rotating spindle member for carrying a tap, said members being relatively movable with respect to one another between forward and reverse drive positions, means for transmitting rotary drive from one member to the other, said means including at least one driving member positioned between the members, the said spindle having a bore for conveying coolant from the upper end of the spindle to the tap and stretchable means within the spindle to accommodate relative axial movement between the first rotating member and the spindle, while conveying coolant to the tap, and a substantially rigid conduit member within said stretchable means, for carrying coolant to said tap.

9. The invention as set forth in claim 8 further including pressure relief means connected to said substantially rigid conduit, for relieving back pressure of said coolant thereby preventing leakage of said coolant.

10. The invention as set forth in claim 9, wherein said pressure relief means comprises a coolant release passage, for evacuating coolant under back pressure to ambient.

11. The invention as set forth in claim 10 wherein a portion of said coolant release passage is defined in said insert member and another portion thereof is defined in said spindle member.

12. The invention as set forth in claim 10, further including an inlet member sealed to said stretchable conduit means for admitting coolant to said rigid conduit member, said inlet member defining a fluid passage.

13. The invention as set forth in claim 11 wherein said inlet member has a cross-section and wherein said substantially rigid conduit member has a cross-section which is at least as large as the cross-section of said fluid passage of said inlet member.

14. The invention as set forth in claim 8 wherein said means for transmitting rotary drive from one member to the other comprises at least one dogging part, both of said rotating members having at least one clutching part engageable with said at least one dogging part, said at least one dogging part having at least one slanted side surface for limiting the amount of axial movement required to move between engaging position and disengaged position.

* * * * *